US010539454B2

United States Patent
Reed

(10) Patent No.: US 10,539,454 B2
(45) Date of Patent: Jan. 21, 2020

(54) METHOD AND APPARATUS FOR ZEROING A WEIGH SCALE

(71) Applicant: Michael K. Reed, Buford, GA (US)

(72) Inventor: Michael K. Reed, Buford, GA (US)

(73) Assignee: NCR Corporation, Atlanta, GA (US)

(*) Notice: Subject to any disclaimer, the term of this patent is extended or adjusted under 35 U.S.C. 154(b) by 328 days.

(21) Appl. No.: 14/036,935

(22) Filed: Sep. 25, 2013

(65) Prior Publication Data

US 2015/0082857 A1    Mar. 26, 2015

(51) Int. Cl.
*G01G 23/01*    (2006.01)

(52) U.S. Cl.
CPC ..................... *G01G 23/01* (2013.01)

(58) Field of Classification Search
CPC .... G01G 19/4144; G01G 23/01; G01G 23/16; G06K 7/10722; G06K 7/10861; G06K 7/1096; G07G 1/0072
USPC ......................................................... 73/1.13
See application file for complete search history.

(56) References Cited

U.S. PATENT DOCUMENTS

| | | | | |
|---|---|---|---|---|
| 6,080,938 A * | 6/2000 | Lutz | ..................... | G01G 23/166 177/25.15 |
| 7,296,744 B2 * | 11/2007 | He | ..................... | G06K 7/10732 235/454 |
| 8,464,951 B2 * | 6/2013 | Trajkovic | ................. | G06K 7/10 235/437 |
| 9,053,373 B2 * | 6/2015 | Rambler | ............... | G06K 7/0095 |
| 9,298,957 B2 * | 3/2016 | Joseph | .................. | G06K 7/0095 |
| 2010/0139989 A1 * | 6/2010 | Atwater | ............. | G01G 19/4144 177/245 |
| 2010/0252635 A1 * | 10/2010 | Drzymala | .......... | G06K 7/10722 235/462.41 |
| 2010/0282850 A1 * | 11/2010 | Olmstead | ................. | G01G 3/08 235/440 |
| 2012/0109761 A1 * | 5/2012 | Roquemore | ......... | G06Q 20/204 705/17 |
| 2014/0061305 A1 * | 3/2014 | Nahill | .................. | G06K 7/0095 235/438 |
| 2015/0213326 A1 * | 7/2015 | Utsumi | .............. | H04N 5/23229 348/223.1 |

OTHER PUBLICATIONS

RD 567049 , anonymous, Jul. 10, 2011, Research Disclosure, p. 1-2.*

* cited by examiner

*Primary Examiner* — Nimeshkumar D Patel
*Assistant Examiner* — Nashmiya S Fayyaz
(74) *Attorney, Agent, or Firm* — Schwegman, Lundberg & Woessner

(57) ABSTRACT

An optical code scanner is presented that includes a weigh scale and a least one image capture device. The image capture device captures images that are used to read optical codes presented to the optical code scanner for reading. The image capture device further captures images of the top surface of a weigh plate on the weigh scale. The optical code scanner analyzes the images of the weigh plate before performing a zero function on the weigh scale to determine if an object has been placed on or is touching the weigh plate. The zero function is only performed when no object is placed on or is touching the weigh plate.

17 Claims, 5 Drawing Sheets

METHOD AND APPARATUS FOR ZEROING A WEIGH SCALE

FIELD OF THE INVENTION

The present invention relates to optical code scanners and more specifically to optical code scanners with an integrated weigh scale that performs an improved zero function.

BACKGROUND

Optical code scanners are used in point of sale (POS) terminals to read optical codes on items which are presented to the POS terminals for purchase as part of a purchase transaction. Integrated into some of the optical code scanners are weigh scales that are used to weigh items sold by weight. To maintain scale accuracy, a zero function is periodically performed by the scale, usually at the request of an operator. The zero function causes the weigh scale to determine the weight of the elements or structures that are part of the weigh scale and attached to the weight determining elements of the weigh scale. The determined weight becomes the zero weight for the weigh scale after each zero function is performed. The weigh scale determines the net weight of an item placed on the weigh scale by measuring the gross weight which includes the weight of the item and the elements and structures attached to the weight determining elements and then subtracting the zero weight.

The zero function should not be performed when any foreign item or material is present on the weigh scale as this would cause an improper zero weight to be set which would cause any subsequent determined weight for items to be inaccurate. Thus, an operator must determine that the proper conditions exist before causing the weigh scale to perform a zero function. This requires training for the operator.

SUMMARY

Among its several aspects, the present invention seeks to overcome or ameliorate at least one of the disadvantages of the prior art, or to provide a useful alternative.

Among its several aspects, the present invention recognizes that a zero function must be periodically performed on a weigh scale that is part of an optical code scanner to maintain the accuracy of the weigh scale. The invention further recognizes that performing the zero function when an object is resting on or touching the weigh plate of the weigh scale will cause the zero function to measure an incorrect zero weight causing subsequent weight measurements to be inaccurate. The invention recognizes that there is an advantage to being able to perform a zero function without intervention or support from an operator and that there is an advantage to being able to deny an operator requested zero function when an object is resting on or touching the weigh plate.

In accordance with the teachings of the present invention, an optical code scanner with a weigh scale is provided that uses images captured by the optical code scanner to determine when a zero function may be properly executed and when a zero function must be prevented from executing. The optical code scanner captures images of the weigh plate of the weigh scale and uses the image to determine if an object is resting on or touching the weigh plate. The optical code scanner only executes a zero function when the weigh plate is clear and no object is resting on or touching it.

Among its several aspects, the present invention recognizes there is an advantage to being able to prevent the execution of a zero function when it would result in an incorrect zero weight. The invention further recognizes that being able to automatically detect when it is proper to perform a zero function permits the zero function to be periodically performed without operator input which maintains the accuracy of the weigh scale.

In accordance with an embodiment of the present invention, there is provided an optical code scanner. The optical code scanner comprising: a weigh scale adapted to determine the weight of an object placed on a weigh plate of the weigh scale; an image capture device adapted to capture an image of the top surface of the weigh plate; and wherein the optical code scanner is adapted to perform a zero function on the weigh scale when an analysis of a captured image of the weigh plate determines that no object is resting on the weigh plate.

In accordance with an embodiment of the present invention, there is provided a method implemented by a processor in an optical code scanner. The method comprising: receiving an indication to perform a zero function on a weigh scale; capturing an image of a weigh plate of the weigh scale from an image capture device; and performing the zero function on the weigh scale when the captured image shows no object is touching the weigh plate.

In accordance with another embodiment of the present invention, there is provided an optical code scanner. The optical code scanner comprises: a weigh scale adapted to determine the weight of an object placed on a weigh plate of the weigh scale; an image capture device adapted to capture images of items presented for scanning and to capture images of the top surface of the weigh plate when no items are present; a memory adapted to store computer instructions and data; and a processor in communication with the weigh scale, the image capture device and the memory are adapted to execute computer instructions which when the processor executes the computer instructions they cause the processor to perform the steps of: receiving an indication to perform a zero function on a weigh scale; capturing an image of the weigh plate of the weigh scale from an image capture device; and performing the zero function on the weigh scale when the captured image shows no object is touching the weigh plate.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
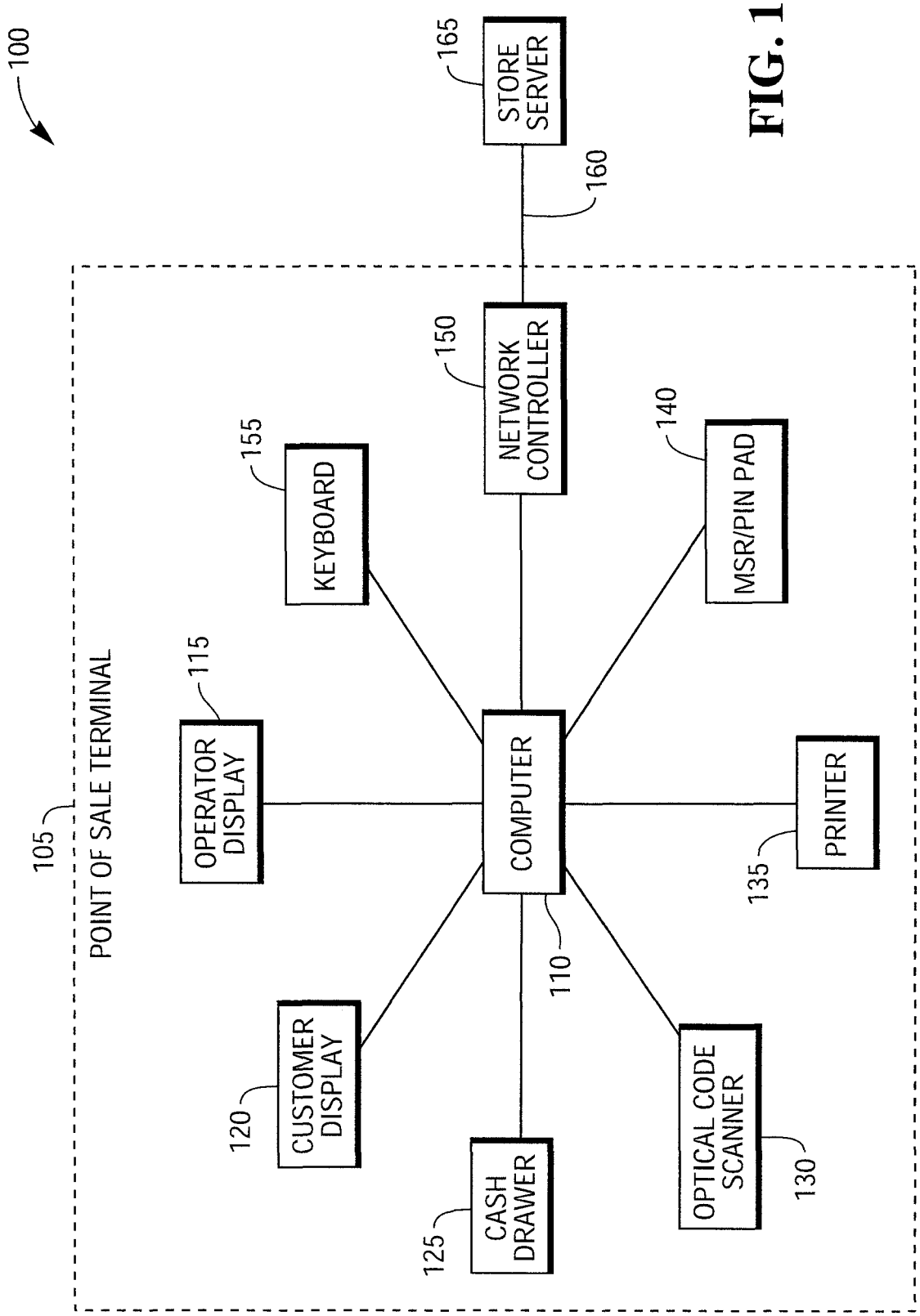
FIG. 1 is a high-level block diagram illustrating a retail point of sale system of the present invention.

With reference to FIG. 1, there is provided a high-level block diagram illustrating a point of sale system 100 including a point of sale (POS) terminal 105 that uses a network 160 to communicate with a store server computer 165. The point of sale system 100 may suitably include more than one POS terminal 105 where each POS terminal 105 communicates over the network 160 with the store server computer 165. The POS terminal 105 may be implemented as either an assisted or a customer operated POS terminal.

In this embodiment, the POS terminal 105 includes a computer 110 and a number of components and peripherals that are controlled by the computer 110. The POS terminal 105 further includes an operator display 115, a customer display 120, a cash drawer 125, an optical code scanner 130, a printer 135, a magnetic stripe reader (MSR) and personal identification number (PIN) pad 140, a network controller 150 and a keyboard 155.

Figure 2:
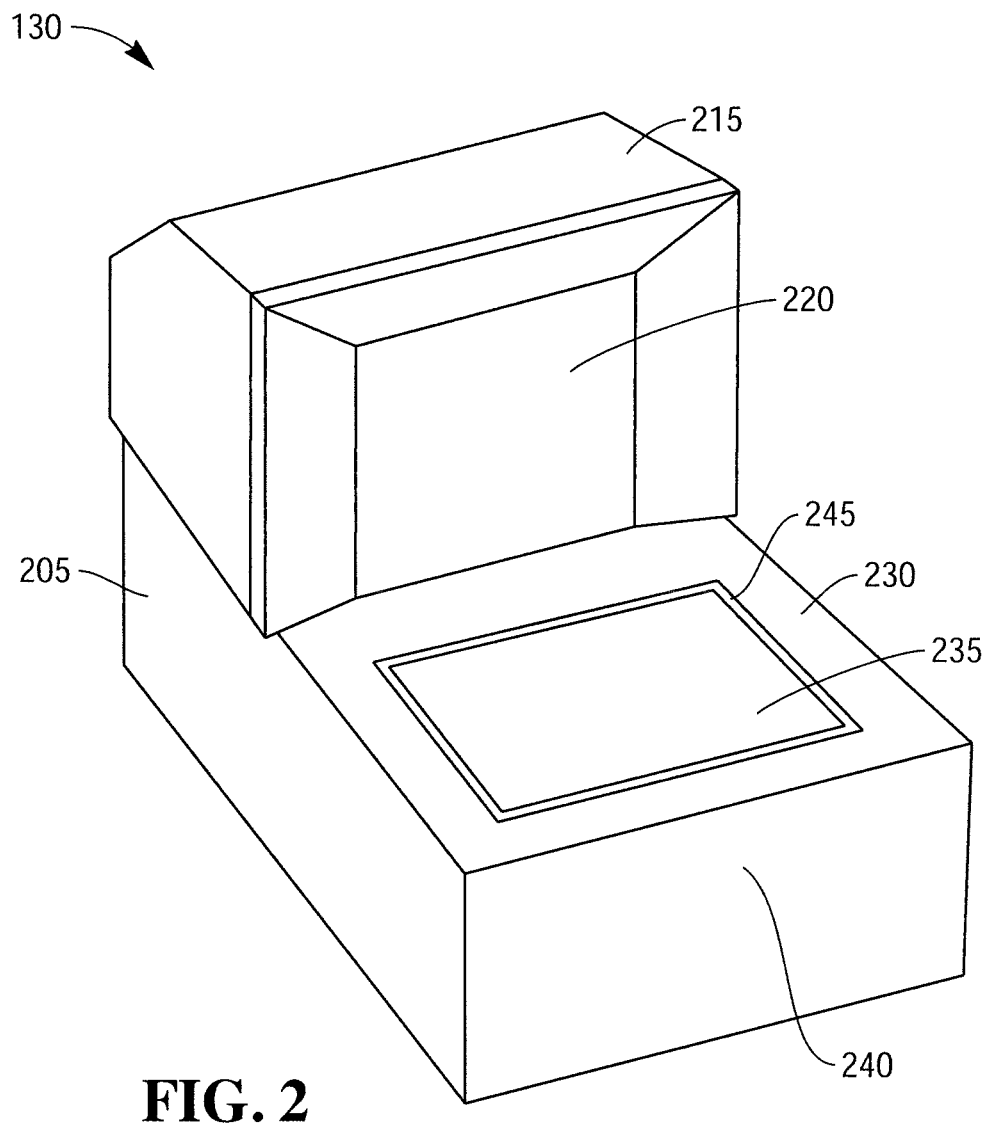
FIG. 2 is a high-level drawing illustrating an optical code scanner of the present invention.

The operator display 115 displays information used by a cashier to operate the POS terminal 105. In this embodiment, the cashier is a trained operator employed to, at least in part, operate the POS terminal 105. The keyboard 155 is used by the cashier to input data and commands to the computer 110. The cash drawer 125 is controlled by the computer 110 and stores currency, checks, coupons and the like. In some embodiments, the cash drawer 125 is replaced by an automatic cash acceptor/dispenser which is controlled by the computer 110 and accepts and dispenses currency. The optical code scanner ("scanner") 130 is used to read optical codes presented to the POS terminal 105 for identification. In some embodiments, the scanner 130 includes a weigh scale as part of a horizontal window (FIG. 2, 235). The weigh scale determines the weight of an item placed on the horizontal window 235. The customer display 120 is visible to the customer and used to display information about the transaction to the customer.

The network controller 150 has hardware and software necessary to support a connection to the local area network 160 and for the computer 110 to communicate over the local area network 160 to the store server 165 or other computers and POS terminals on the network 160 or to computers on other networks connected to the local area network 160. In some embodiments, the network controller 150 supports a transmission control protocol/internet protocol (TCP/IP) network protocol and the local area network 160 is an Ethernet network.

The MSR/PIN PAD 140 reads information from a magnetic stripe usually attached to the back of a card, such as a credit or debit card, loyalty card or the like. The PIN pad portion 140 is used to enter PIN numbers associated with a credit or debit card. The MSR/PIN Pad 140 device also includes software and hardware to communicate with an external server used to process credit transactions. The printer 135 is used to print customer receipts and other documents.

The store server 165 includes software and data used to process purchase transactions being performed at the POS terminal 105. The data includes a product lookup database that is used to identify items presented to the POS terminal 105 for purchase. When an optical code is scanned by the POS terminal 105, information read from the optical code is sent to the store server 165 and used to identify a data record in the product lookup database. The data record includes information about the item the optical code is attached to including a price and description of the item. This information is returned back to the POS terminal 105 and is used to process a purchase transaction. The store server 165 also maintains information on all purchase transactions performed by the POS terminal 105 and can either process payment requests or contact external computer servers that will process the payment requests.

Referring now to FIG. 2, there is provided a high-level drawing illustrating an exemplar embodiment of the optical code scanner 130. The optical code scanner 130 reads optical codes presented to the optical code scanner 130. An optical code is a computer readable representation of information. In this embodiment, optical codes can be attached to or printed on an item or object or displayed on an electronic display such as the display screen of a cell phone or tablet computer. The optical code may suitably include one dimensional and two dimensional bar codes. The optical code scanner 130 can read optical codes based on symbologies that include but are not limited to: UPS, EAN, Code 128, GS1 DataBar™, Datamatrix, Aztec, QR and MaxiCode.

The scanner 130 includes the horizontal scanning window 235 and a vertical scanning window 220. The horizontal scanning window 235 is part of a weigh plate 245 that is part of a horizontal housing component 230 of the scanner 130. The weigh plate 245 or top plate is part of a weigh scale 435 (FIG. 4) and objects are placed on the weigh plate 245 to be weighed by the weigh scale 435. The vertical scanning window 220 is housed in a vertical housing component 215 of the scanner 130 and faces an operator side 240 of the scanner 130. The side of the vertical housing component 215 that houses the vertical scanning window 220 is the front of the scanner 130 and faces the operator of the scanner 130. The two scanning windows 220, 235 are composed of an optically transparent material such as hurricane glass or sapphire coated glass.

An operator scans an item by orienting an optical code on an item or device so it faces either the vertical scanning window 220 or the horizontal scanning window 235 and then moving the item past the windows. The scanner 130 produces an indication, such as an audio sound or a light, once the optical code has been identified and read. The scanner 130 uses imaging technology to capture an image of the optical code and decode or read it.

In some embodiments, the scanner 130 also includes laser scanning technology that uses one or more lasers to scan and read an optical code. The laser beams from the laser are directed to form scanning patterns through the vertical scanning window 220 and the horizontal scanning window 235. When a directed laser beam strikes and moves across an object presented to the scanner 130, the object reflects a portion of the laser light. Some of the reflected laser light passes back through one of the scanning windows (220 or 235) and is directed to a photodetector that produces electrical signal data proportional to the amount of light received. The received electrical signal data is processed to detect the presence of an optical code and to recover the information associated with the optical code.

Figure 3:
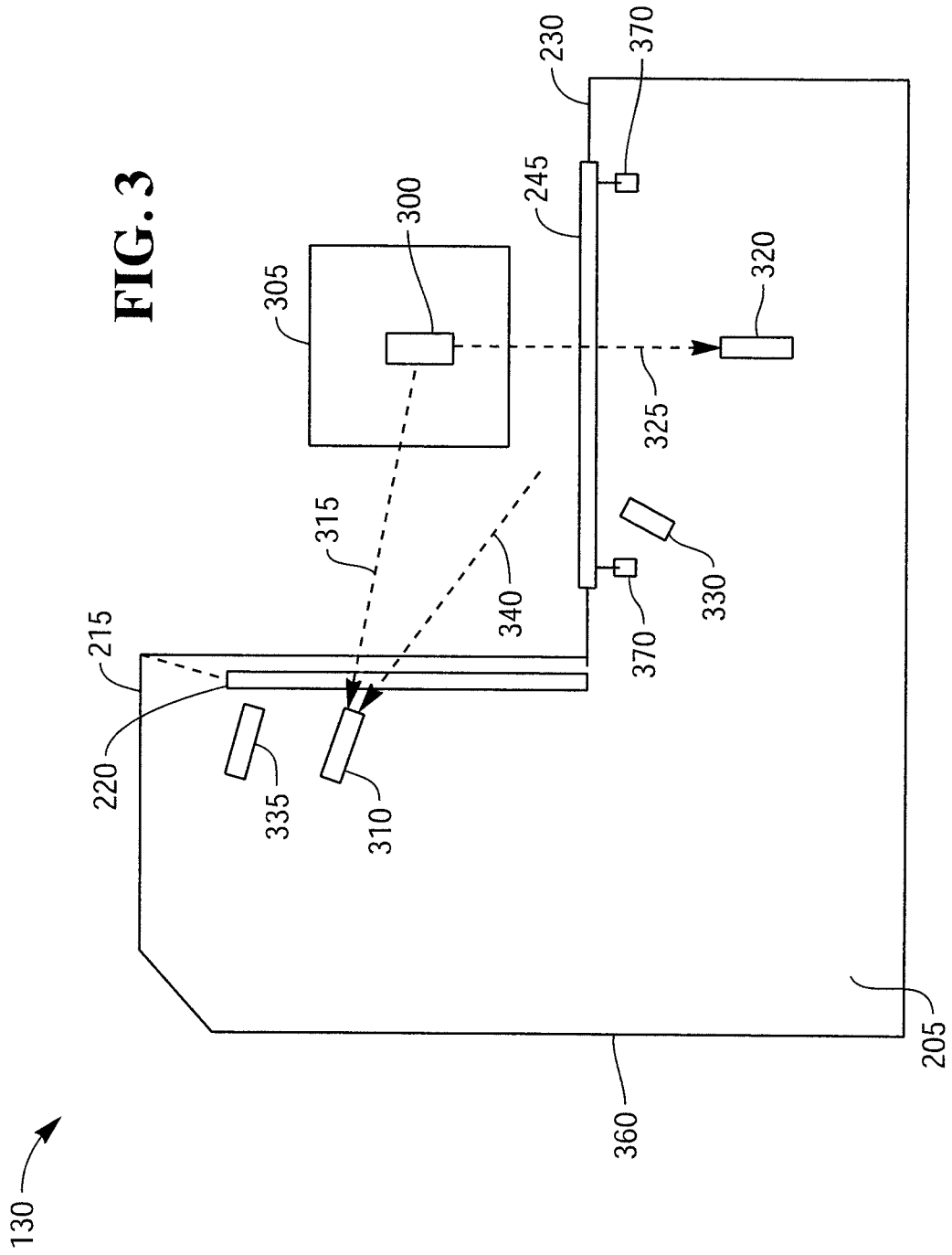
FIG. 3 is a high-level cross-sectional drawing illustrating the optical code scanner.

Referring to FIG. 3, there is provided a high-level cross-sectional drawing further illustrating the exemplar embodiment of the optical code scanner 130. The scanner 130 includes a first image capture device 310 and a second image capture device 320. The first image capture device 310 receives images through the vertical scanning window 220. The first image capture device 310 can capture images of an object 300 along a first image path 315 or it can capture images of the weigh plate 245 along a second image path 340. The first image capture device 310 can capture an image of the entire weigh plate 245 which is used to determine if an object has been placed on or is touching the weigh plate 245.

The two image capture devices 310, 320 preferably may be implemented using a complementary metal oxide semiconductor (CMOS) image capture device. In some embodiments, the image capture devices are based on other technologies such as charged-coupled device (CCD) technology. Some embodiments will also have a different number of image capture devices. The image capture devices 310, 320 capture an electronic image of the optical image directed to the device. The electronic image is captured in the form of digital image data that represents the value of the light received by each pixel of each image capture device 310, 320. In some embodiments, each of the image capture devices 310, 320 includes a lens that focuses images directed at the image capture devices 310, 320 onto the capture surface of the respective image capture devices 310, 320.

Items to be scanned by the scanner 130 are passed through a target scanning area 305. The target scanning area 305 is a volume of space above the horizontal scanning window 235 and in front of the vertical scanning window 220. Optical codes that pass through the target scanning area 305 will be in the field of view of one of the image capture devices 310, 320. For example, an image of an object 300, located within the target scanning area 305, is received along the first image path 315 and captured by the first image capture device 310. Another image of the object 300 is received along a second image path 325 and captured by the second image capture device 320. The optical codes can be presented in either printed form or electronic form, for example, they can be displayed on an electronic display.

A first illumination device 335 generates and directs light through the vertical scanning window 220 to the target scanning area 305. A second illumination device 330 generates and directs light through the horizontal scanning window 235 to the target scanning area 305. The illumination devices 335, 330 can be turned on and off as required and the output light level can also be adjusted as required. While depicted as single elements, in some embodiments, each of the illumination devices 335, 330 includes a plurality of individual illumination devices such as LEDs that may by positioned in different locations within the scanner 130 and direct light to different portions of the target scanning area 305.

The weigh scale 435 includes load cells 370. The load cells 370 are used to determine the weight of the weigh plate 245 that includes the horizontal scanning window 235, the elements and structures than connect the weigh plate 245 to the load cells 370 and any object on the weigh plate 245. The weigh scale 435 measures the gross weight of everything connected to the load cells 370 and any object placed on the weigh plate 245. A zero weight is the weight of the weigh plate 245 including the horizontal scanning window 235 and the elements and structures that connect the weigh plate 245 to the load cells 370. The zero weight is determined when no objects are on or touching the weigh plate 245. If an object is on or touching the weigh plate 245 while the zero weight is being determined, subsequent weight measurements of objects on the weigh plate 245 will not be accurate. The weight of an object placed on the weigh plate 245 is determined by measuring the gross weight and then subtracting the zero weight from it. From time to time, the zero weight of the weigh scale 435 should be measured to correct for minor changes or drift associated with the load cells 370. The zero weight is determined by executing a zero function. A request to perform a zero function can be made by a person, called an operator, that is operating the optical scanner 130 or by the computer 110 using the network connection 465. In addition, a request to perform a zero function can be made by internal hardware or software of the optical code scanner 130. For example, a software timer that is implemented by an operating system can generate an event that requests a zero function to be performed.

Figure 4:
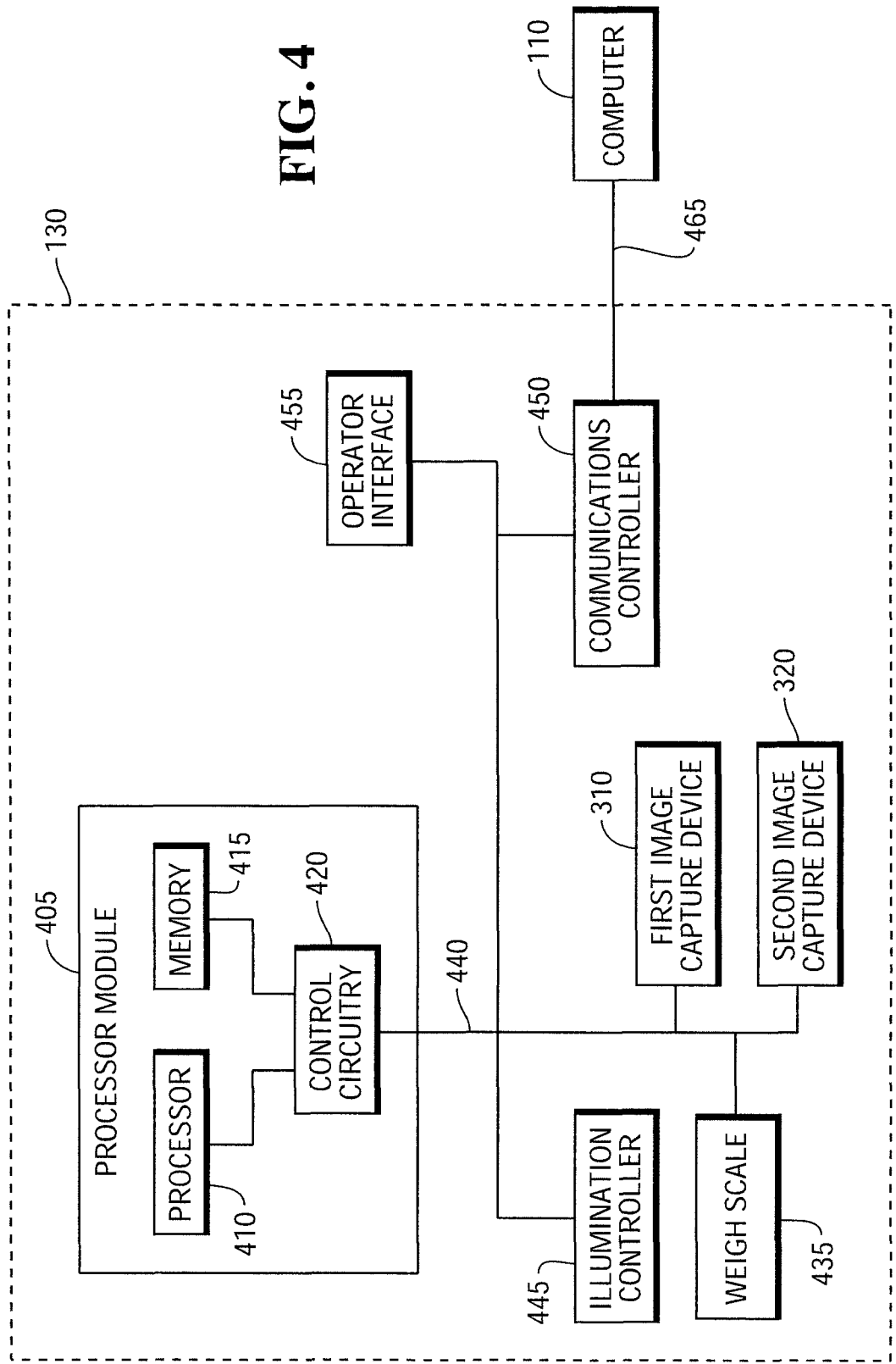
FIG. 4 is a high-level block diagram illustrating selected hardware components of the optical code scanner.

With reference to FIG. 4, there is provided a high-level block diagram illustrating an exemplar embodiment of certain hardware components of the scanner 130. The scanner 130 includes a processor module 405 which includes a processor 410, a memory 415, and control circuitry 420. The memory 415 is non-transitory and computer readable. The memory 415 includes both volatile and non-volatile memory. The non-volatile memory may suitably include solid state and rotating memory devices. The processor 410 executes computer instruction stored in the memory 415 which causes the processor 410 to control the components of the scanner 130 and to implement the features and functions of the scanner 130.

The control circuitry 420 includes hardware interfaces between the processor 410 and the memory 415 and between the processor 410 and a bus 440 used to communicate with other components of the scanner 130. The control circuitry 420 further includes a programmable device that can be programmed by the processor 410 to generate one or more events to the processor 410. When the processor 410 receives an event, the processor 410 executes computer instructions that are associated with the event. In this embodiment, the programmable device is programmed to generate an event that causes the processor 410 to perform a zero function when the weigh plate is clear. In some embodiments, the programmable device is an interrupt controller that is programmable by the processor 410 to generate hardware interrupts to the processor 410 where the interrupts are associated with events. In some embodiments, the function of the programmable device is replaced by a software function such as a software timer function that generates an event after a programmed period of time has expired.

The scanner 130 further includes an illumination controller 445, an operator interface 455 and a communications controller 450. The bus 440 connects the processor 410 to the first image capture device 310, the second image capture device 320, the weigh scale 345, the operator interface 455 and the communications controller such that the processor 410 can communicate with and control each of them.

The illumination controller 445 controls the illumination devices 335, 330. The illumination controller 445 turns the illumination devices 335, 330 on or off as needed and sets an illumination output level that is between off and full power. The illumination devices 335, 330 may be turned off when the scanner 130 is not in use to save power. Where laser scanning technology is used, the laser and laser directing device, such as a spinner, are controlled by the processor 410 and are turned off when not in use to save power and reduce noise.

The communications controller 450 includes the hardware and software required for the scanner 130 to connect to and communicate over the network connection 465 to the computer 110. In some embodiments, the network connection 465 is implemented as a universal system bus (USB). In other embodiments, the network connection 465 is implemented as an RS-232 interface.

The operator interface 455 includes input devices, such as buttons and a speaker that produces audible sounds associated with different functions which are used to communicate information to the operator. One of the buttons may suitably be used by an operator to request that a zero function be performed.

Figure 5:
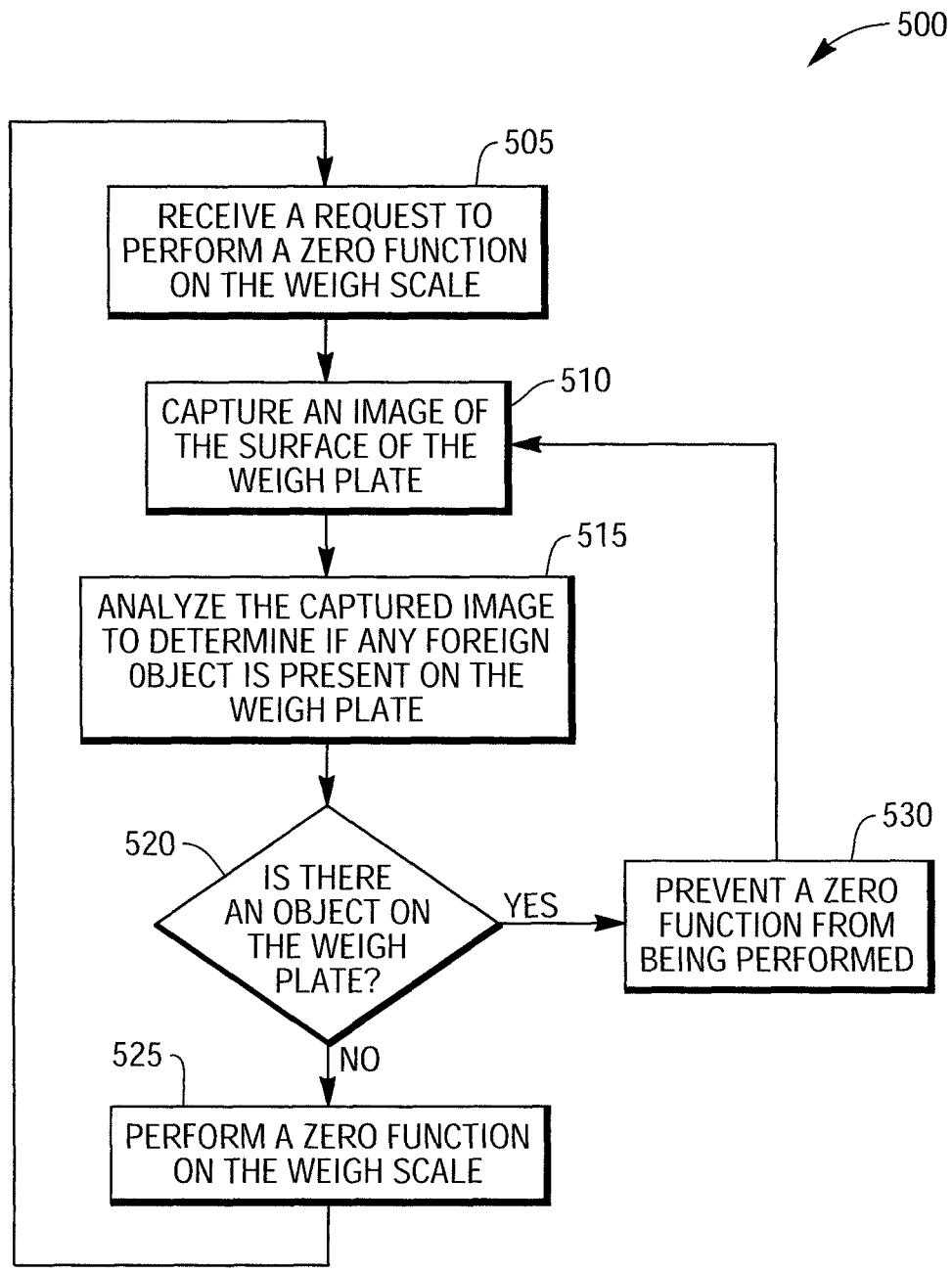
FIG. 5 is a high-level flow diagram illustrating a method of operating the optical code scanner.

Turning to FIG. 5, there is provided a high-level flow diagram illustrating a method 500 of operating the optical code scanner 130. The following method describes one embodiment of the optical code scanner 130 and one example method for operating it. The method described below is performed by the processor 410 in the optical code scanner 130.

In step 505, the processor 410 receives a request to perform a zero function on the weigh scale. The request may suitably be received from an operator through the operator interface 455 or from the interrupt device in the control circuitry 420.

In step 510, the processor 410 captures an image of the top surface of the weigh plate 245 using the first image capture device 310. The first image capture device 310 has a view of the top surface of the weigh plate 245.

In step 515, the processor 410 analyzes the captured image of the top surface of the weigh plate 245 to determine if any foreign object is present on the weigh plate 245. The analysis determines if an object is completely resting on the weigh plate 245 or is partially touching the weigh plate 245. The analysis also determines when no object is resting on or touching the weigh plate 245. For the zero function to accurately determine the zero weight, no object can be resting on or touching the weigh plate 245.

In step 520, the processor 410 uses the results of the analysis to determine if an object is resting on or touching the weigh plate 245. Control passes to step 530 when it is determined that an object is resting on or touching the weigh plate 245, otherwise control passes to step 525.

In step 530, the processor 410 prevents the execution of a zero function because an object is resting on or touching the weigh plate 245. If a zero function were to be performed, the resulting zero weight may not be accurate and may cause subsequent weight measurements by the weigh scale 345 to be inaccurate. Therefore, the requested zero function is not performed. When the request to perform the zero function is received from the operator interface 455, the processor 410 sends information back to the operator that indicates an object is resting on or touching the weigh plate 245 and must be removed before the zero function can be performed. When the request to perform the zero function is the result of a non-operator request, information about the request is typically not sent to an operator interface device. This is because an operator may not be present. However, if the processor 410 has determined that an operator is present, information about the non-operator request can be sent to the operator. The event or interrupt device will continue to periodically generate an event or interrupt to signal a request to perform a zero function but the zero function will only be performed after the object has been removed and the weigh plate is clear.

In step 525, the processor 410 performs a zero function on the weigh scale 345. The processor 410 causes the weigh scale 345 to measure the current gross weight which includes the weigh plate 245, the horizontal window 235 and all the elements and structures that connect the weigh plate 245 to the load cells 370. The processor 410 then compares the measured gross weight to the stored zero weight to determine if the difference is within a predetermined weight range. If it is, the measured gross weight is stored as the new zero weight. If the difference between the two weights is greater than the predetermined weight range, the measured gross weight is discarded as being invalid and stored zero weight is retained. It is normal for the load cells 370 to drift during operation but the drift is usually small. If a large change in weight is detected, this usually means something is wrong such as an object or some foreign body is resting on or touching the weigh plate 245. The predetermined weight range is selected to include normal drifts in measured weight but would not include larger differences that would indicate the presence of an object on the weigh plate 245. In some embodiments, the processor 410 sends an error message to the operator that indicates this problem.

Although the present invention has been described with particular reference to certain preferred embodiments thereof, variations and modifications of the present invention can be effected within the spirit and scope of the following claims.

What is claimed is:

1. An optical code scanner comprising:
the optical code scanner includes:
a weigh scale adapted to determine the weight of an object placed on a weigh plate of the weigh scale, wherein the weigh scale integrated into the scanner and situated beneath a horizontal scan window of the scanner;
an image capture device adapted to capture images of the weigh plate and other images of items presented for scanning, wherein the image capture device is integrated into the scanner within a vertical scan window of the scanner; and
a processor configured:
to generate interrupts to the processor based on specific events, to receive a request to perform a zero function, to analyze a captured image of the weigh plate that is captured by the image capture device in order to determine whether any object is touching the horizontal scan window based on the captured image from the image capture device through the vertical scan window, to determine that an operator is present, to alert the operator when the operator is present that an object is touching the horizontal scan window and correspondingly the weigh plate and for the operator to remove the object, to perform the zero function when an analysis of the captured image with respect to the horizontal scan window and the weigh plate results in a determination that no object is touching the horizontal scan window and the weigh plate after alerting the operator, and to prevent a continuing received event that indicates that the zero function is needed when an operator is not present unless a determination is made that the object is not touching the horizontal scan window and the weigh plate based on subsequent captured images of the horizontal scan window and weigh plate, and wherein the processor is further configured to process the zero function automatically and periodically without operator input from the operator when the operator is not present and the object is not touching the horizontal scan window and the weigh plate to maintain the accuracy of the weigh plate, and the processor is configured to process the zero function when the operator is present only when a second determination determines that the object is not touching the horizontal scan window and the weigh plate.

2. The optical code scanner of claim 1, wherein the optical code scanner is further adapted to prevent the performance of the zero function on the weigh scale when the analysis of the subsequent captured images of the horizontal scan window and the weigh plate determines that the object is touching the weigh plate.

3. The optical code scanner of claim 1, further comprising:
   an operator interface adapted to receive commands from the operator wherein one of the commands is a command to perform the zero function on the weigh scale.

4. The optical code scanner of claim 1, further comprising:
   a programmable interrupt device that is adapted to generate an interrupt that causes the optical code scanner to perform the zero function on the weigh scale.

5. The optical code scanner of claim 4, wherein the programmable interrupt device is programmed to periodically generate an interrupt that causes the optical code scanner to perform the zero function on the weigh scale.

6. A method implemented by a processor in an optical code scanner, the method comprising:
   receiving, by the processor of the optical code scanner, an indication to perform a zero function on a weigh scale integrated into the scanner and situated beneath a horizontal scan window of the scanner, wherein receiving further includes interrupting the processor based on a specific detected event;
   capturing, by the processor of the optical code scanner, images of a weigh plate of the weigh scale from an image capture device in response to the indication, wherein the image capture device is integrated into a vertical scan window of the scanner;
   analyzing, by the processor of the optical code scanner, a first captured image to determine whether any objects are touching the weigh plate, wherein the first captured image is of the horizontal scan window and captured from the vertical scan window;
   determining, by the processor of the optical code scanner, that an operator is present;
   alerting, by the processor, of the optical code scanner, the operator when an object is touching the horizontal scan window and the weigh plate to remove the object when the operator is present; and
   performing, by the processor of the optical code scanner, the zero function on the weigh scale when a second captured image shows no object is touching the horizontal scan window and the weigh plate after alerting the operator when the operator is present, and preventing a continuing received event that indicates that the zero function is needed when an operator is not present unless a determination is made that the object is not touching the horizontal scan window and the weigh plate based on a third captured image in which case the zero function is automatically and periodically processed without any operator input from the operator to maintain accuracy of the weigh plate, and processing the zero function when the operator is present only when image analysis of the horizontal scan window and the weigh plate indicate no object is touching the horizontal scan window and the weigh plate.

7. The method of claim 6, wherein the indication is received from an operator interface.

8. The method of claim 6, wherein the indication is periodically received from an interrupt device programmed to generate a periodic interrupt that causes the zero function to be performed when no object is touching the horizontal scan window and the weigh plate.

9. The method of claim 6, further including:
   ignoring the received indication to perform the zero function on the weigh scale when the third captured image is determined to indicate that the object is touching the horizontal scan window and the weigh plate and the operated is determined to not be present by preventing the zero function from processing on the weigh plate.

10. The method of claim 7, wherein alerting comprises:
    sending an error message using the operator interface wherein the error message indicates the object is touching the horizontal scan window and the weigh plate.

11. The method of claim 6, wherein performing the zero function includes:
    determining a gross weight of the weigh scale; and
    storing the gross weight as a zero weight for the weigh scale when the determined gross weight is within a predetermined range of weights.

12. The method of claim 11, wherein performing the zero function further includes:
    retaining an original zero weight for the weigh scale when the determined gross weight is outside the predetermined range of weights.

13. An optical code scanner comprising:
    the optical code scanner includes:
       a weigh scale adapted to determine the weight of an object placed on a weigh plate of the weigh scale, wherein the weigh scale is integrated into the scanner and situated beneath a horizontal scan window of the scanner;
       an image capture device adapted to capture images of the weigh plate and other images of items presented for scanning, wherein the image capture device is integrated into a vertical scan window of the scanner;
       a memory that stores computer instructions and the images; and
       a processor in communication with the weigh scale, the image capture device and the memory, wherein the processor is configured to execute the computer instructions to:
          generate interrupts to the processor based on specific events;
          receive an indication to perform a zero function on the weigh scale;
          capture an image of the horizontal scan window from the image capture device of the vertical scan window and the weigh plate from the image capture device in response to receiving the indication;
          analyze a captured image of the horizontal scan window and the weigh plate to determine whether any other object or any of the items is resting on the horizontal scan window and the weigh plate;
          determine that an operator is present;
          alert the operator when one of the other objects or one of the items is touching the horizontal scan window and the weigh plate to remove the one other object or the one item when the operator is determined to be present; and perform the zero function on the weigh scale when the captured image shows none of the other objects and none of the items are touching the horizontal scan window and the weigh plate after alerting the operator when the operator is present and prevent a continuing received event that indicates that the zero function is needed from processing the zero function when an operator is not present unless a determination is made subsequent images of the horizontal scan window and weigh plate indicate that the other objects and the items are not touching the weigh plate in which case the zero function is automatically and periodically processed without any operator input from the operator to maintain accuracy of the weigh plate, and only processing the zero function when the operator is present when the other objects and the items are determined through image analysis to not be touching the horizontal scan window and the weigh plate.

14. The optical code scanner of claim 13, wherein the indication is received from an operator interface.

15. The optical code scanner of claim 13, wherein the indication is periodically received from an interrupt device programmed to generate a periodic interrupt that causes the zero function to be performed when none of the other objects and none of the items are touching the horizontal scan window and the weigh plate.

16. The optical code scanner of claim 14, wherein the processor is further configured to alert the operator by sending an error message using the operator interface wherein the error message indicates a particular one of the other objects or a particular item is touching the horizontal scan window and the weigh plate.

17. The optical code scanner of claim 13, wherein performing the zero function includes:
    determining a gross weight of the weigh scale;
    storing the gross weight as a zero weight for the weigh scale when the determined gross weight is within a predetermined range of weights; and
    retaining an original zero weight for the weigh scale when the determined gross weight is outside the predetermined range of weights.

* * * * *